(12) United States Patent
Wang et al.

(10) Patent No.: US 11,706,505 B1
(45) Date of Patent: Jul. 18, 2023

(54) PROCESSING METHOD, TERMINAL DEVICE, AND MEDIUM

(71) Applicant: LEMON INC., Grand Cayman (KY)

(72) Inventors: Yufei Wang, Los Angeles, CA (US);
Xiaojie Li, Los Angeles, CA (US);
Longyin Wen, Los Angeles, CA (US);
Xinyao Wang, Los Angeles, CA (US);
Guang Chen, Los Angeles, CA (US);
Ye Yuan, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/816,911

(22) Filed: Aug. 2, 2022

(30) Foreign Application Priority Data

Apr. 7, 2022 (CN) .......................... 202210365446.9

(51) Int. Cl.
*H04N 7/16* (2011.01)
*H04N 21/8549* (2011.01)

(52) U.S. Cl.
CPC ............................... *H04N 21/8549* (2013.01)

(58) Field of Classification Search
CPC .................................................. H04N 21/8549
USPC .......................................................... 725/143
See application file for complete search history.

(56) References Cited

U.S. PATENT DOCUMENTS

| | | | | |
|---|---|---|---|---|
| 8,204,317 B2* | 6/2012 | Barbieri | ................. | G06V 20/47 382/224 |
| 8,798,400 B2* | 8/2014 | Hill | ........................ | G06V 20/47 382/218 |
| 10,887,542 B1* | 1/2021 | Brandt | ........... | H04N 21/440245 |
| 2005/0044489 A1* | 2/2005 | Yamagami | .............. | G11B 27/34 |
| 2006/0103736 A1* | 5/2006 | Obrador | ........... | H04N 21/64792 348/222.1 |
| 2011/0161818 A1* | 6/2011 | Viljamaa | ................. | G11B 27/34 715/720 |
| 2012/0197419 A1* | 8/2012 | Dhruv | .............. | H04N 21/26258 700/94 |

(Continued)

FOREIGN PATENT DOCUMENTS

| CN | 106604125 A | 4/2017 |
|---|---|---|
| CN | 108833973 A | 11/2018 |

(Continued)

OTHER PUBLICATIONS

Office Action dated Apr. 28, 2023 in Chinese Application No. 202210365446.9, with English translation (12 pages).

(Continued)

*Primary Examiner* — Jefferey F Harold
*Assistant Examiner* — Sahar Aqil Riaz
(74) *Attorney, Agent, or Firm* — Faegre Drinker Biddle & Reath LLP

(57) ABSTRACT

Provided are a processing method, a terminal device, and a medium. The method includes the steps described below. Basic information of a target video is determined; attribute information of the target video is determined based on the basic information; in a case where the attribute information indicates that the target video is a video capable of being structured, chapter division is performed on the target video based on the basic information to obtain at least two video clips; and chapter description information of the at least two video clips, a key frame of the at least two video clips and video description information of the target video are determined.

14 Claims, 3 Drawing Sheets

(56) References Cited

U.S. PATENT DOCUMENTS

| | | | | |
|---|---|---|---|---|
| 2013/0201188 A1* | 8/2013 | Choi | ..................... | G06T 19/006 |
| | | | | 345/419 |
| 2013/0290846 A1* | 10/2013 | Calhoun | ................. | G06F 16/43 |
| | | | | 715/719 |
| 2013/0315570 A1* | 11/2013 | Jang | ................... | H04N 21/8549 |
| | | | | 386/326 |
| 2014/0136526 A1* | 5/2014 | Calhoun | ............. | G06F 16/7844 |
| | | | | 707/723 |
| 2014/0198027 A1* | 7/2014 | Edelstein | ................ | G06F 21/00 |
| | | | | 345/156 |
| 2015/0154456 A1* | 6/2015 | Pau | ....................... | G06V 10/462 |
| | | | | 382/201 |
| 2017/0134754 A1* | 5/2017 | Pan | ........................ | H04N 19/23 |
| 2017/0280208 A1* | 9/2017 | Mishra | ................. | G06V 10/764 |
| 2022/0108550 A1* | 4/2022 | Kim | ..................... | G06K 9/6256 |

FOREIGN PATENT DOCUMENTS

| | | |
|---|---|---|
| CN | 110688526 A | 1/2020 |
| CN | 111160191 A | 5/2020 |
| CN | 112100438 A | 12/2020 |
| CN | 113992944 A | 1/2022 |
| WO | 200128240 A1 | 4/2001 |

OTHER PUBLICATIONS

Search Report dated Apr. 26, 2023 in Chinese Application No. 202210365446.9, with English translation (7 pages).

\* cited by examiner

PROCESSING METHOD, TERMINAL DEVICE, AND MEDIUM

CROSS REFERENCE TO RELATED APPLICATION

This application claims the priority to Chinese Patent Application No. CN202210365446.9 and filed on Apr. 7, 2022, the disclosure of which is incorporated herein by reference in its entirety.

TECHNICAL FIELD

Embodiments of the present disclosure relate to the field of computer technologies, in particular, a processing method and apparatus, a terminal device and a medium.

BACKGROUND

As the technology develops, various application programs, such as video application programs, emerge in endlessly. User may browse videos through the video application program. However, there are a large number of videos in video application program, and the user is able to know the information of the video only through entirely watching the video.

Currently, to improve the efficiency of conveying valuable information in the video, publishers describe the main points of the video so that a viewer can have a general understanding of the video based on the shown main points when the video is presented. However, only by the publisher summarizing the video, the valuable information in the video is still inefficiently conveyed.

SUMMARY

Embodiments of the present disclosure provide a processing method and apparatus, a terminal device and a medium, so that the efficiency of conveying valuable information of a target video is improved.

In a first aspect, an embodiment of the present disclosure provides a processing method. The processing method includes steps described below.

Basic information of a target video is determined.

Attribute information of the target video is determined based on the basic information.

In a case where the attribute information indicates that the target video is a video capable of being structured, chapter division is performed on the target video based on the basic information to obtain at least two video clips.

Chapter description information of the at least two video clips, a key frame of the at least two video clips and video description information of the target video are determined.

In a second aspect, an embodiment of the present disclosure further provides a processing apparatus. The processing apparatus includes a first determination module, a second determination module, a division module and a third determination module.

The first determination module is configured to determine basic information of a target video.

The second determination module is configured to determine attribute information of the target video based on the basic information.

The division module is configured to in a case where the attribute information indicates that the target video is a video capable of being structured, perform chapter division on the target video based on the basic information to obtain at least two video clips.

The third determination module is configured to determine chapter description information of the at least two video clips, a key frame of the at least two video clips and video description information of the target video.

In a third aspect, an embodiment of the present disclosure further provides a terminal device. The terminal device includes one or more processors and a storage apparatus configured to store one or more programs.

The one or more programs, when executed by the one or more processors, cause the one or more processors to implement the processing method of the embodiment of the present disclosure.

In a fourth aspect, an embodiment of the present disclosure further provides a computer-readable storage medium storing a computer program which, when executed by a processor, implements the processing method of the embodiment of the present disclosure.

The embodiments of the present disclosure provide a processing method and apparatus, a terminal device and a medium. The method includes steps described below. Basic information of a target video is determined; attribute information of the target video is determined based on the basic information; in a case where the attribute information indicates that the target video is a video capable of being structured, chapter division is performed on the target video based on the basic information to obtain at least two video clips; and chapter description information of the at least two video clips, a key frame of the at least two video clips and video description information of the target video are determined. Through the preceding technical solutions, when it is determined based on the attribute information that the target video is a video capable of being structured, the accurate chapter division of the target video can be implemented based on the basic information of the target video, so that the visual effect of the target video can be improved based on the chapter description information of the video clips, the key frame of the video clips and the video description information of the target video, and thus the efficiency of conveying the valuable information of the target video can be improved.

BRIEF DESCRIPTION OF DRAWINGS

The preceding and other features, advantages and aspects of the embodiments of the present disclosure will become more apparent with reference to the following specific implementations thereof in conjunction with the drawings. Same or similar reference numerals in the drawings denote same or similar elements. It is to be understood that the drawings are illustrative and that originals and elements are not necessarily drawn to scale.

DETAILED DESCRIPTION

Figure 1:
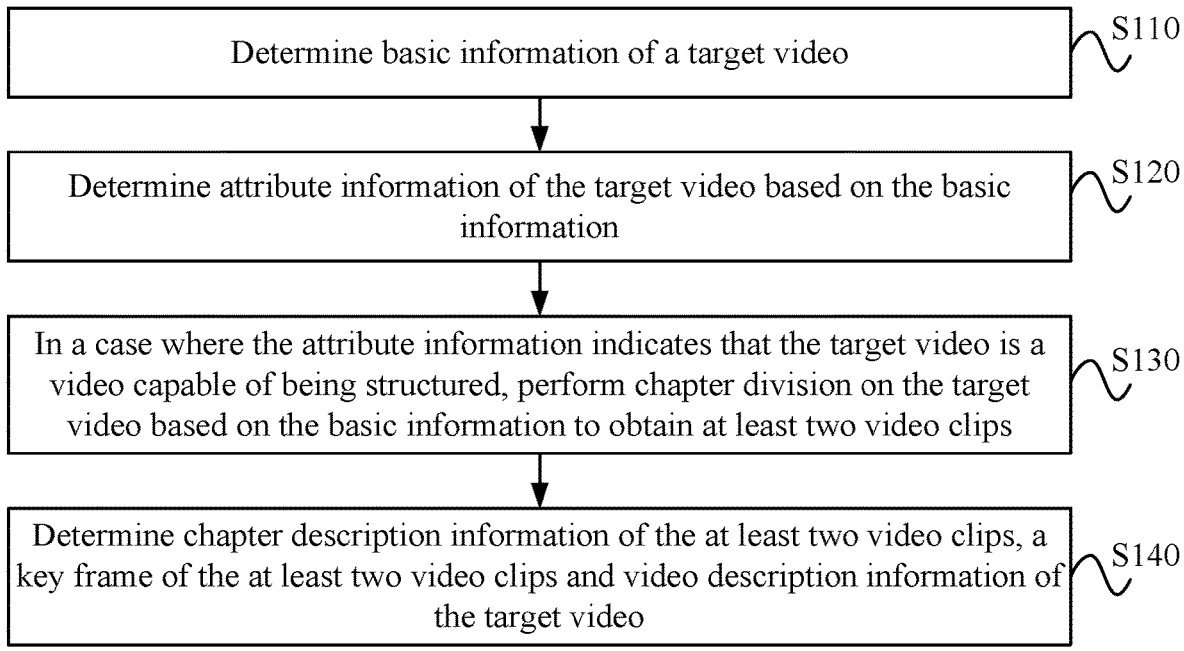
FIG. 1 is a flowchart of a processing method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely illustrative and are not intended to limit the scope of the present disclosure.

It is to be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

Optional features and examples are provided in each of the multiple embodiments described below. Multiple features described in the embodiments may be combined to form multiple optional solutions. Each numbered embodiment should not be regarded as only one solution. Additionally, if not in collision, the embodiments in the present disclosure and the features thereof may be combined with each other.

Embodiment One

FIG. 1 is a flowchart of a processing method according to embodiment one of the present disclosure. The method is applicable to the case of processing a video and may be implemented by a processing apparatus. The apparatus may be implemented by software and/or hardware and is generally integrated on a terminal device. In the embodiment, the terminal device includes but is not limited to: a computer, a laptop, a tablet and/or a mobile phone.

As shown in FIG. 1, the processing method provided in embodiment one of the present disclosure includes steps described below.

In S110, basic information of a target video is determined.

The target video may be understood as a to-be-processed video, for example, a video published by a publisher. The video published by the publisher may be a video that has been shot but not edited, or a video that has undergone preliminary processing (such as cropping, adding titles and subtitles, etc.) after shot.

The basic information may refer to information contained in the target video, such as text information, image information and/or salient object information. The text information may be text appearing in the target video, such as titles and commentary text, or may be text corresponding to audio in the target video. The salient object information may be information characterizing the salient object.

In the embodiment, the basic information of the target video may be determined for subsequent steps. This step does not limit the specific method for determining the basic information, and different basic information may be determined according to different means. For example, the target video may be input into various feature extraction models, separately, to generate specific basic information of the target video, and the various feature extraction models may be a character recognition model, an image recognition model and/or a speech recognition model. For another example, the target video may be input into a processing model to directly generate specific basic information of the target video. For another example, in the present application, audio-video analysis processing may be directly performed on the target video without using a model to obtain the corresponding basic information. The character recognition model, the image recognition model, the speech recognition model and the processing model will not be explained in detail here and may be obtained through pre-training by related personnel.

In S120, attribute information of the target video is determined based on the basic information.

The attribute information may refer to information characterizing an attribute of the target video. The attribute is not limited here. For example, the information may includes but not is limited to information characterizing whether the target video is a video capable of being structured and may also include the type of the target video. The attribute information may be used for characterizing whether the target video can be segmented. The attribute information may be determined based on the basic information of the target video, and the means for determining the attribute information is not limited. Exemplarily, the attribute information may be determined according to the number of shot cuts of images in the target video, or may be determined according to the content of the text information in the target video, or may be determined according to the change of the salient object in the target video. It is to be noted that the attribute information may be determined by using a combination of one or more of the preceding manners related to the basic information, which is not limited here.

In S130, in a case where the attribute information indicates that the target video is a video capable of being structured, chapter division is performed on the target video based on the basic information to obtain at least two video clips.

When the attribute information indicates that the target video is a video capable of being structured, it means that the target video can be segmented, and in this case, the chapter division may be performed on the target video based on the basic information to obtain at least two video clips. The specific steps for chapter division are not limited in the embodiment. Different basic information may correspond to different division steps, or different basic information may be comprehensively analyzed to perform the chapter division on the target video.

Exemplarily, several pieces of candidate slice information may be determined based on the basic information of the target video, and the target video is segmented into multiple initial video clips based on each piece of candidate slice information; and then each initial video clip is evaluated to determine final video clips. The several pieces of candidate slice information may be determined according to different pieces of basic information respectively.

In S140, chapter description information of the at least two video clips, a key frame of the at least two video clips and video description information of the target video are determined.

The chapter description information may be understood as a brief description of each video clip and is used for characterizing the main content of each video clip. For example, when the target video is a food production video containing 3 video clips, each video clip may correspond to a piece of chapter description information at this time. For example, the chapter description information corresponding to the first video clip may refer to finished product display, the chapter description information corresponding to the second video clip may refer to food material preparation, and the chapter description information corresponding to the third video clip may refer to production steps.

The key frame may refer to an image or a clip (which may be considered as a highlight frame or a set of highlight frames) in a video clip and having the maximum relevance to the video description information, or the key frame may show a highlight moment in a video clip or may be considered as an image or a clip interesting viewers in a video clip.

The video description information may be considered as a summary of main points of the target video, such as note information expressing the meaning of the target video, and the note information may be information characterizing the notes of the target video. For example, when the target video is a food production video, the video description information may include the dish name, the type of food materials to be prepared, the description of production steps, the description of matters needing attention, etc.

After each video clip is determined, the chapter description information of the video clips, the key frame of the video clips and the video description information of the target video can be separately determined. The specific manners for determination are not limited in this step and are not expanded on here, as long as the chapter information, the key frame and the video description information can be obtained.

According to the processing method provided by embodiment one of the present disclosure, basic information of a target video is determined; attribute information of the target video is determined based on the basic information; in a case where the attribute information indicates that the target video is a video capable of being structured, chapter division is performed on the target video based on the basic information to obtain at least two video clips; and chapter description information of the at least two video clips, a key frame of the at least two video clips and video description information of the target video are determined. Through the preceding method, when it is determined based on the attribute information that the target video is a video capable of being structured, it is determined that the accurate chapter division of the target video can be implemented based on the basic information of the target video, and thus the chapter description information of the video clips, the key frame of the video clips and the video description information of the target video are further determined, so that the target video can be more visualized, and the efficiency of conveying the valuable information of the target video can be improved.

On the basis of the preceding embodiment, variant embodiments of the preceding embodiment are proposed, and it is to be noted that here, for the brevity of description, only differences from the preceding embodiment are described in the variant embodiments.

In an embodiment, the basic information includes one or more pieces of: salient object information, image information, first text information corresponding to text in the target video and second text information corresponding to audio in the target video.

The salient object information may be referred to as information characterizing the salient object in the target video, and the salient object may be the object in the target video. For example, the salient object information may include persons, animals, plants, and/or things. For example, if the target video is a video of food tasting, the salient object information may be persons, food and the like appearing in the target video. In the embodiment, the salient object information of the target video may be recognized by performing frame extraction processing on the target video and analyzing the video frames; or the salient object information of the target video may be determined based on the category of the salient object. The manner for determining the category of the salient object is not limited. The category of the salient object may be determined based on the category of the target video or may be preset. The salient object information of the target video may also be determined through a trained model.

The image information may be a visual feature of each frame of image in the target video, for example, may include a person feature, a color feature, etc. In the embodiment, the image information may be obtained by a first information extraction module performing frame image recognition on the target video.

The first text information may refer to a text description added to the target video, for example, may be commentary text, dialogues, explanatory words and/or subtitles. In the embodiment, the first text information may be obtained by a second information extraction module performing text extraction on the text in the target video.

The second text information may refer to the text information corresponding to the audio in the target video, and may be obtained by recognizing the audio. Speech recognition may be performed on the audio in the target video to obtain the second text information. It is to be noted that the first text information and the second text information are only used for distinguishing between different objects, and the first text information and the second text information are not limited here.

In an embodiment, the step in which the chapter description information of the video clips is determined includes the step described below.

The chapter description information is determined based on third text information corresponding to text in the video clips, fourth text information corresponding to audio in the video clips, image information corresponding to the video clips and a first copy keyword corresponding to the video clips, where the first copy keyword is determined based on the video clips.

The third text information may refer to a text description added to the video clips, for example, may be commentary text, dialogues, explanatory words and/or subtitles in the video clips. The fourth text information may refer to text information corresponding to the audio in the video clips, and may be obtained by recognizing the audio. The first copy keyword may be understood as a character which constrains the generated chapter description information, and is used for constraining the to-be-generated chapter description information. For example, if the first copy keyword is tasting, the chapter description information is a description related to tasting. The first copy keyword may be determined according to the content of the video clips. For example, the first copy keyword may be generated by a model according to the target video; or the corresponding first copy keyword may be determined according to classification information of the target video, etc.

Specifically, the chapter description information may be determined based on the third text information corresponding to the text in the video clips, the fourth text information corresponding to the audio in the video clips, the image information corresponding to the video clips and the first copy keyword corresponding to the video clips, and the specific steps for determining the chapter description information are not limited in the embodiment.

Exemplarily, after the third text information, the fourth text information, the image information corresponding to the video clips and the first copy keyword are obtained, the obtained information may be separately processed into the form of feature vectors, for representation, then the processed feature vectors are input to a video description model, and the video description model analyzes the feature vectors characterizing the video clips to generate the chapter description information corresponding to the video clips. The video description model may be understood as a model for outputting corresponding description information according to the input information, and the video description model is not expanded on in the embodiment.

The chapter description information may also be determined based on the title of the target video. For example, words in the title are taken as units, each word is processed into a feature vector by using a word vector and is input into the video description model, so as to determine the chapter description information.

In an embodiment, the step in which the video description information of the target video is determined includes the step described below.

The video description information is determined based on the first text information, the second text information, the image information and a second copy keyword corresponding to the target video, where the second copy keyword is determined based on the target video.

The second copy keyword may be understood as a character which constrains the generated video description information, and is used for constraining the to-be-generated video description information. For example, if the second copy keyword is try-on, the video description information related to try-on is generated. The second copy keyword may be determined according to the content of the target video. For example, the second copy keyword may be generated by a model according to the target video; or the corresponding second copy keyword may be determined according to classification information of the target video, etc.

Specifically, the video description information may be determined based on the first text information, the second text information, the image information and the second copy keyword corresponding to the target video, and the specific steps for determining the video description information are not limited in the embodiment.

Exemplarily, the first text information, the second text information and the image information may be separately processed into the form of feature vectors, for representation, then the processed feature vectors are input into the video description model, the video description model analyzes the feature vectors characterizing the target video to obtain the second copy keyword, and the corresponding video description information is generated in combination with the second copy keyword. The method for processing the first text information, the second text information and the image information into the feature vectors may be that, for example, words in the first text information and the second text information may be taken as units, each word is processed into a feature vector by using a word vector; frames in the visual feature in the image information are taken as units, and frames are processed into feature vectors by using a convolution neural network.

The video description information may also be determined based on the title of the target video. For example, words in the title are taken as units, each word is processed into a feature vector by using a word vector and is input into the video description model, so as to determine the video description information.

In an embodiment, the step in which the key frame of the video clips is determined includes the step described below.

The key frame corresponding to the video clips is determined based on the video clips and the chapter description information corresponding to the video clips.

In the embodiment, the key frame corresponding to the video clips may be determined based on the video clips and the chapter description information corresponding to the video clips. Specifically, a feature related to the video clips may be matched to a feature related to the chapter description information, and a frame or video clip related to the chapter description information is selected from the video clips. The feature related to the video clips may include: the salient object information, the third text information, the fourth text information and the image information corresponding to the video clips. The feature related to the chapter description information may include: the text feature of the video description information. When the frame or video clip related to the chapter description information is selected from the video clips, the image or clip having the highest matching degree or the matching degree greater than a set value may be selected according to a matching result as the key frame corresponding to the video clips.

In addition, the type of the key frame may be predicted according to the video description information, and the predicted type of the key frame is used for assisting in the determination of the key frame, so as to improve the accuracy of the key frame.

In an embodiment, the number of the key frame is at least one, and the key frame is an image corresponding to the chapter description information.

It can be understood that the key frame may be one frame or multiple frames, that is, the key frame may be a frame of image or a clip composed of multiple frames of images, and different video clips may correspond to the same number of key frames or different numbers of key frames, which are not limited here.

In the present disclosure, the key frame corresponding to the video clips may be generated based on a model. For example, the video clips, the chapter description information, the salient object information and a key frame category are input into the model to obtain a timestamp of the key frame corresponding to the video clips.

Embodiment Two

Figure 2:
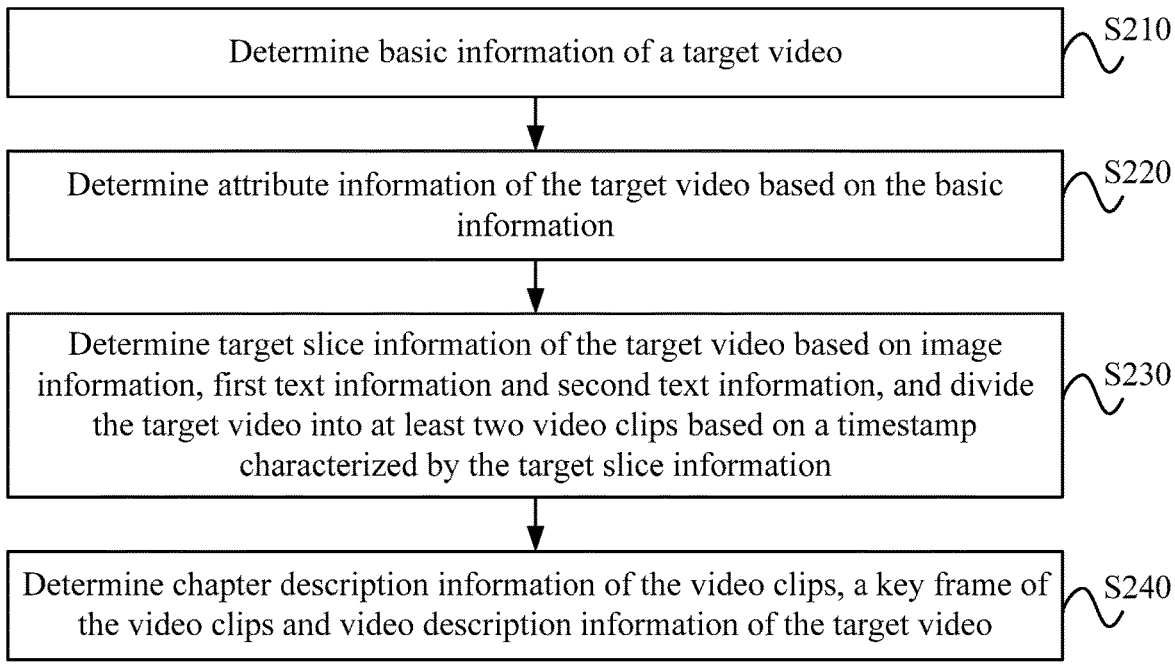
FIG. 2 is a flowchart of a processing method according to embodiment two of the present disclosure.

FIG. 2 is a flowchart of a processing method according to embodiment two of the present disclosure. Embodiment two is specified based on the optional solutions in the preceding embodiments. In the embodiment, the step in which the chapter division is performed on the target video based on the basic information to obtain the at least two video clips is further specified as follows. Target slice information of the target video is determined based on the image information, the first text information and the second text information, and the target video is divided into the at least two video clips based on a timestamp characterized by the target slice information.

For the content not detailed in the embodiment, reference may be made to embodiment one.

As shown in FIG. 2, the processing method provided in embodiment two of the present disclosure includes steps described below.

In S210, basic information of a target video is determined.

In S220, attribute information of the target video is determined based on the basic information.

In S230, target slice information of the target video is determined based on image information, first text information and second text information, and the target video is divided into at least two video clips based on a timestamp characterized by the target slice information.

The target slice information may refer to a finally determined segmentation point of the target video, and the target video is divided based on the timestamp characterized by the target slice information. Specifically, the target slice information of the target video may be determined based on the image information, the first text information and the second text information.

Exemplarily, the image information, the first text information and the second text information may be directly input into a slice model to output the target slice information of the target video, and the slice model may be a pre-trained neural network model for directly outputting the target slice information of a video.

Exemplarily, several pieces of candidate slice information may also be obtained based on a preset rule, which may include, but is not limited to: determining each shot cut point of the target video based on the image information; determining a first sentence end point of the target video based on the first text information; determining a second sentence end point of the target video based on the second text information, etc.; then each initial video clip segmented based on each piece of candidate slice information is evaluated to determine the target slice information. The evaluation may be implemented by a model. The outputs of the model may be evaluation scores corresponding to various pieces of candidate slice information, and the determination of the target slice information can be achieved based on the evaluation scores. For example, the target slice information is determined in combination with a set strategy, where the set strategy includes the number of pieces of candidate slice information included in a single piece of candidate chapter information and/or the duration of a single candidate chapter.

The single candidate chapter is determined based on an adjacent piece of candidate slice information in the candidate slice information corresponding to probability information after selection. A single candidate chapter may be considered as each candidate clip after an original video is segmented according to the candidate slice information corresponding to the probability information after selection.

In S240, chapter description information of the video clips, a key frame of the video clips and video description information of the target video are determined.

According to the processing method provided in embodiment two of the present disclosure, basic information of a target video is determined; attribute information of the target video is determined based on the basic information; target slice information of the target video is determined based on image information, first text information and second text information, and the target video is divided into at least two video clips based on a timestamp characterized by the target slice information; and chapter description information of the video clips, a key frame of the video clips and video description information of the target video are determined. In this method, the target slice information is accurately determined based on the image information, the first text information and the second text information, and the segmentation on the target video is achieved.

Figure 3:
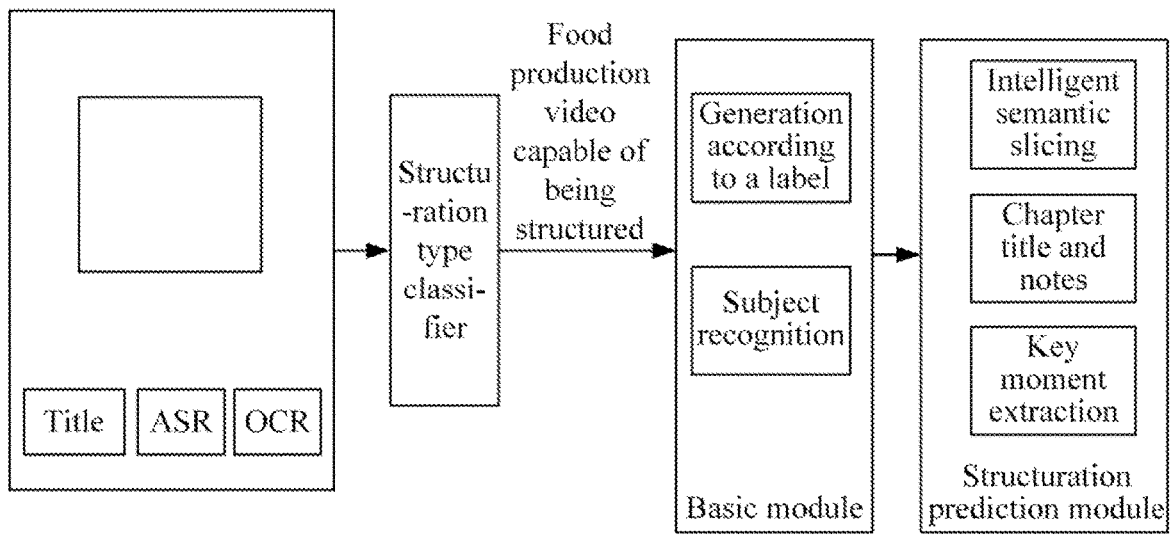
FIG. 3 is a diagram showing the architecture of a processing method according to embodiment two of the present disclosure.

FIG. 3 is a diagram showing the architecture of a processing method according to embodiment two of the present disclosure. As shown in FIG. 3, the processing method provided in the embodiment includes four processes. In first process, the basic information of the target video is determined, where the basic information includes titles, Automatic Speech Recognition (ASR) text (that is, the second text information), optical character recognition (OCR) text (that is, the first text information); in the second process, the attribute information of the target video is determined based on a structuration type classifier; in the third process, when the attribute information indicates that the target video is a video capable of being structured and is a food production video, the basic module performs salient object recognition on the target video to obtain the salient object information and performs label generation on the target video to obtain the basic information other than the salient object information; in the fourth process, intelligent semantic slicing is performed(that is, the chapter division performed on the target video based on the basic information to obtain at least two video clips), then chapter title and note extraction (that is, the chapter description information and the video description information) and key moment (that is, the key frame of the video clips) extraction may be performed according to the determined basic information.

The intelligent semantic slicing may include specific steps described below.

1. A candidate slice information set of an original video is determined based on video information of the original video. The original video may be considered as the target video in the embodiment. The video information (that is, the basic information in the embodiment) may be information contained in the original video. For example, the video information may include information characterized by an image in the original video, text (such as titles) and audio in the original video, etc. The candidate slice information set may be understood as a set of each piece of candidate slice information of the original video. The candidate slice information may be information characterizing a candidate segmentation point, such as a timestamp. The candidate slice information requires subsequent evaluation and selection to determine a final segmentation point so as to be used for segmenting the original video to obtain video slices.

In this step, the candidate slice information set of the original video may be determined based on the video information of the original video. The specific method for determining the candidate slice information set is not limited, and different video information corresponds to different determination methods. For example, each image in the original video may be subjected to image recognition, and the candidate slice information is determined based on the recognized content; the audio in the original video may be recognized, and the candidate slice information is determined based on the recognized content; or text appearing in the original video may be recognized, and the candidate slice information is determined based on the recognized content, etc., which is not limited in the embodiment.

In an embodiment, the video information includes each frame of image in the original video, the second text information corresponding to the audio in the original video and the first text information in the original video. Correspondingly, the step in which the candidate slice information set of the original video is determined based on the video information of the original video includes the steps describe below.

A shot cut point of the original video is determined based on each image.

A second sentence end point of the original video is determined based on the first text information.

A first sentence end point of the original video is determined based on the second text information.

The shot cut point, the first sentence end point and the second sentence end point are taken as the candidate slice information of the original video and is added to the candidate slice information set.

In the embodiment, the second text information may refer to text information corresponding to the audio in the original video, and the text information may be obtained by recognizing the audio. The first text information may be text information obtained by recognizing text, such as subtitles, titles and/or keyword stickers, in the original video. The first text information and the second text information are only used for distinguishing between different objects, and the first text information and the second text information are not limited here.

The shot cut point may be referred to as a timestamp of a moment for the shot cut in the original video; the second sentence end point may be referred to as a timestamp of the end moment of a sentence in the first text information in the original video; and the first sentence end point may be referred to as a timestamp of the end moment of each sentence after the second text information is segmented in the original video. As described above, the first sentence end point and the second sentence end point are only used for distinguishing between different objects, and the first sentence end point and the second sentence end point are not limited here.

Specifically, when the candidate slice information set is determined based on the video information of the original video, each piece of candidate slice information may be separately determined according to each frame of image (that is, the image information in the embodiment) in the original video, the second text information corresponding to the audio in the original video and the first text information in the original video. The shot cut point of the original video may be determined based on the cut state of the shot; the second sentence end point of the original video is determined according to the end point of each sentence in the first text information; the first sentence end point of the original video is determined according to the end point of each piece of text in the second text information; finally, the shot cut point, the first sentence end point and the second sentence end point may be taken as the candidate slice information of the original video and added to the candidate slice information set. In the embodiment, the order of determining the shot cut point, the first sentence end point and the second sentence end point is not limited. The shot cut point, the first sentence end point and the second sentence end point may be determined simultaneously, or may be determined sequentially, etc.

2. The original video is segmented into multiple video clips based on each piece of candidate slice information in the candidate slice information set.

After the candidate slice information set of the original video is determined, the original video may be segmented based on each piece of candidate slice information in the candidate slice information set into multiple video clips. For example, the original video is segmented at the position of the timestamp characterized by each piece of candidate slice information to obtain multiple video clips.

3. The multiple video clips are input into an evaluation model, and probability information of each piece of candidate slice information is determined.

The probability information may be understood as a probability value that the candidate slice information can be taken as the target slice information. The evaluation model may be used for evaluating the candidate slice information to obtain the corresponding probability information, and the evaluation model may be pre-trained by relevant technical personnel and is not expanded on here.

After the multiple video clips are obtained after segmentation, each video clip may be input into the evaluation model to determine the probability information of each piece of candidate slice information. The specific steps for determining the probability information is not limited in the embodiment. For example, the probability information may be determined based on the specific content in each video clip.

4. The target slice information of the original video is determined based on the probability information corresponding to each piece of candidate slice information.

The target slice information may refer to the timestamp corresponding to the finally determined segmentation point. In this step, the target slice information of the original video may be determined based on each piece of obtained probability information, where the specific method for determining the target slice information is not limited. For example, the number of pieces of target slice information may be determined according to the duration of the original video, and then several pieces of probability information having relatively high probability values are selected from various pieces of probability information to determine the corresponding target slice information. For another example, the probability information having the probability value greater than a set probability threshold may be selected from various pieces of probability information to determine the target slice information of the original video, and the set probability threshold may be set by the system or relevant personnel, which is not limited in the embodiment.

When the target slice information is selected by setting the probability threshold, the target slice information may also be determined in combination with a set strategy. The set strategy may be used for constraining the finally obtained video slices and is not limited here.

The chapter title and note extraction may involve specific steps described below.

1. A target video is acquired.

In this step, the target video is a video whose copy information is to be determined. The target video may be the original video or a certain video clip obtained by segmenting the original video according to the preceding target slice information. Different video clips may be considered as different chapters of the original video.

2. Video information of the target video is determined.

Specifically, the video information of the target video may be determined. The specific method for determining the video information is not limited in this step, and different video information corresponds to different determination means. For example, the target video may be input into a feature extraction model to generate specific video information of the target video, and the feature extraction model may include a character recognition model, an image recognition model and/or a speech recognition model, etc. For another example, in the present application, audio-video analysis processing may be directly performed on the target video without using a model to obtain the corresponding video information.

3. Copy information corresponding to the video information is generated by using a video description model, and the video description model generates the copy information based on a task prompt and a copy keyword.

The video description model may be understood as a model for outputting the copy information corresponding to the video information according to the input video information. In the embodiment, the video description model may be pre-trained, and the process of training is not specifically limited here. The copy information may refer to a brief description of the target video, and is used for characterizing the main content of the target video. For example, when the target video is a certain video clip in the original video, the copy information at this time may be chapter information corresponding to the video clip, that is, the description (the chapter description information) of the video clip; when the target video is the original video, the copy information may be a summary of the main points of the original video, that is, note information (the video description information) of the meaning expressed by the original video.

The task prompt may be considered as a character prompting the type of the generated copy information. The video description model in the present disclosure may be a multitasking model that constrains tasks processed by the video description model through the task prompt. For example, the task prompt indicates the processing of a chapter task, where the chapter task may include the task of generating the chapter information like a chapter keyword and the chapter description information. For another example, the task prompt indicates the processing of a note task, where the note task may include the task of generating the note information like a note keyword and note description information. The category of the task included in the task prompt is not limited here, and may be determined according to actual situations.

The copy keyword may be a character which constrains the keyword of the generated copy information, and is used for constraining the keyword of the copy information intended to be generated. The source of the copy keyword is not limited. For example, the copy keyword may be generated by the video description model according to the target video, or the corresponding copy keyword may be determined according to classification information of the target video, etc.

A food video is taken as an example. The task prompt may indicate generating the chapter information of chapters, and the copy keyword may constrain the keyword under the category of tasting or production. Then, the chapter keyword and the chapter description information included in the generated chapter information are information related to tasting or production.

In this step, the copy information corresponding to the video information may be generated by using the video description information, and the generated copy information is constrained by the task prompt, the video information and the copy keyword. Specific steps for generating the copy information are not limited here.

In the embodiment of the present disclosure, when the chapter description information of the video clips is determined, that is, when the chapter description information is determined based on third text information corresponding to text in the video clips, fourth text information corresponding to audio in the video clips, image information corresponding to the video clips and a first copy keyword corresponding to the video clips, the first copy keyword is determined based on the video clips.

In the embodiment of the present disclosure, when the video description information of the target video is determined, that is, when the video description information is determined based on the first text information, the second text information, the image information and a second copy keyword corresponding to the target video, the second copy keyword is determined based on the target video.

The key moment extraction may include specific steps described below.

1. A target video and video description information corresponding to the target video are acquired.

The target video is a certain video clip obtained by segmenting the original video according to the preceding target slice information, and in this step, highlight frame or highlight clip analysis is performed on the target video. A highlight frame may be considered as a video frame capable of reflecting important information in the video. A highlight clip may be considered as a video clip reflecting important information in the video. When the target video is a certain video clip in the original video, the video description information is the preceding chapter description information.

2. Salient object information of the target video is determined.

The salient object information may be referred to as information characterizing the salient object in the target video, and the salient object may be the object in the target video. For example, the salient object information may include persons, animals, plants, and/or things. For example, if the target video is a video of food tasting, the salient object information may be persons, food and the like appearing in the target video.

Specifically, after the target video is acquired, the salient object information of the target video may be determined, and the manner for determining the salient object information is not limited here. For example, the salient object information in the target video may be recognized by performing frame extraction processing on the target video and then analyzing the video frame; or the salient object information of the target video may be determined based on the category of the salient object. The manner for determining the category of the salient object is not limited. The category of the salient object may be determined based on the category of the target video or may be preset. The salient object information of the target video may also be determined through a trained model.

3. A key frame category of the video description information is determined.

The key frame category may be understood as the type of a key frame in the target video, and may be determined according to the video description information corresponding to the target video. For example, when the video description information is that a blogger is tasting pickled cabbage with streaky pork, then the key frame category may be a food category or a tasting category, and which category the key frame specifically belongs to is determined based on actual requirements; when the video description information is that a blogger is trying various down clothes on, the key frame category may be a clothing category or a try-on category. The specific means for determining the key frame category is not limited. For example, the video description information may be input into a key frame category prediction model to determine the key frame category of the video description information. The key frame category prediction model is not expanded on in this step. For example, the key frame category prediction model may be obtained by pre-training through a large amount of video description information and corresponding key frame categories.

4. The target video, the video description information, the salient object information and the key frame category are input into a processing model to obtain a timestamp of an image corresponding to the video description information in the target video.

The processing model may be considered as a model for outputting the timestamp of a highlight frame or a highlight clip according to input information. In the embodiment, the input information may include the target video, the video description information, the salient object information, the key frame category, etc. The processing model may be obtained by pre-training, and the process of training may include steps described below. The target video, the video description information, the salient object information and the key frame category in the training stage are input into the processing model first, a matching score corresponding to each frame of image in the target video is output, then the timestamp corresponding to the highest matching score is compared with a timestamp manually pre-marked to correct parameters of the processing model, and until the timestamp corresponding to the highest matching score is the same as the timestamp manually pre-marked or the probability that the timestamp corresponding to the highest matching score is the same as the timestamp manually pre-marked is greater than a certain value, the training may be ended.

The image corresponding to the video description information in the target video may be understood as a certain image (which may be considered as a highlight frame) in the target video having the maximum relevance to the video description information, and one or more images corresponding to the video description information may exist. It is to be understood that the image corresponding to the video description information in the target video may show a highlight moment in the target video or may be an image interesting viewers in the target video, etc. The timestamp of the image corresponding to the video description information in the target video may refer to time data corresponding to the image, which is used for identifying when the image is displayed in the target video. For example, if the target video has the duration of 5 minutes, the timestamp may be at the first minute, that is, the image selected from the target video is located at the first minute.

In this step, the target video, the video description information, the salient object information and the key frame category may be input into the processing model for processing to obtain the timestamp of the image corresponding to the video description information in the target video, where the specific processing process is not limited. The processing model may be an entire model, and can directly output the timestamp of the image according to the input information; the processing model may also include multiple modules, and each module can separately process the input information and then synthesize the processed information to obtain the timestamp of the image corresponding to the video description information in the target video.

Exemplarily, the target video may first be input to a first information extraction module in the processing model to extract image information and first text information in the target video; then the video description information is input into a second information extraction module in the processing model to extract second text information in the video description information; finally, the timestamp of the image corresponding to the video description information in the target video can be comprehensively determined according to the salient object information, the image information, the first text information, the second text information and the key frame category.

Figure 4:
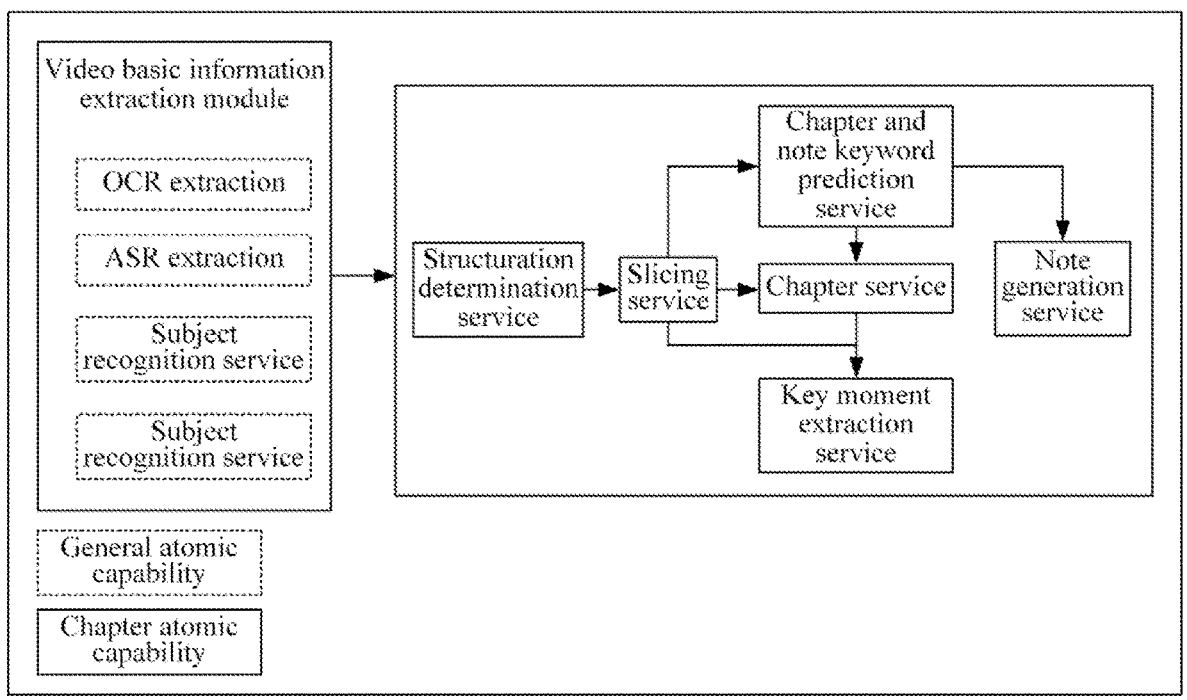
FIG. 4 is a flowchart of a processing method according to embodiment two of the present disclosure.

FIG. 4 is a flowchart of a processing method according to embodiment two of the present disclosure. As shown in FIG. 4, the processing method, that is, an intelligent video structuration scheme, provided in the embodiment includes multiple modules.

Firstly, a video basic information extraction module is included and includes an OCR extraction service, an ASR extraction service, a salient object recognition service and a recognition service, which are respectively used for extracting first text information corresponding to text in a target video, second text information corresponding to audio in the target video and salient object information, etc.

A structuration determination service (that is, a service for determining attribute information) is included and used for performing determination that whether the target video is a video capable of being structured and prediction of the video type according to the extracted basic information (including the image content, the text content, the speech content and the like of the video, that is, image information, the first text information the second text information and the like).

A slicing service is included and is used for performing chapter division on the target video based on the extracted basic information by using the intelligent semantic slicing technology for the video determined as a video capable of being structured (that is, the attribute information indicates that the target video is a video capable of being structure), where each chapter is a semantically independent video clip.

A chapter service and a note generation service are included. On one hand, a first copy keyword corresponding to a video clip is determined based on a chapter and note keyword prediction service, and a text title (that is, chapter description information of a video clip is determined) of each video chapter is predicted, by using a video chapter description technology, based on target slice information (determined by the slicing service), the first copy keyword and the basic information; on the other hand, a second copy keyword corresponding to the target video is determined based on the chapter and note keyword prediction service, and then the note generation service is performed based on the determined first text information, second text information, image information and second copy keyword corresponding to the target video; finally, important information points contained in the chapter is summarized, that is, the video description information of the target video is determined. The chapter and note keyword prediction service may be implemented by a model, or the corresponding first copy keyword or second copy keyword is determined by searching a corresponding keyword table based on the type of the target video.

Finally, a key moment extraction service is included. Through the service, a video clip and chapter description information corresponding to the video clip are obtained based on the slicing service and the chapter service, and then a corresponding key information point (that is, a key frame) in the video clip is positioned by using the key moment extraction technology in combination with the video content, the chapter slice (that is, the video clip) and the result of chapter title prediction (that is, the chapter description information).

Optionally, the intelligent video structuration scheme may further include general atomic capability and chapter atomic capability. The general atomic capability refers to that the capability of the atomic is general and the chapter atomic capability refers to that the capability of the atomic is special used for the chapter.

Embodiment Three

Figure 5:
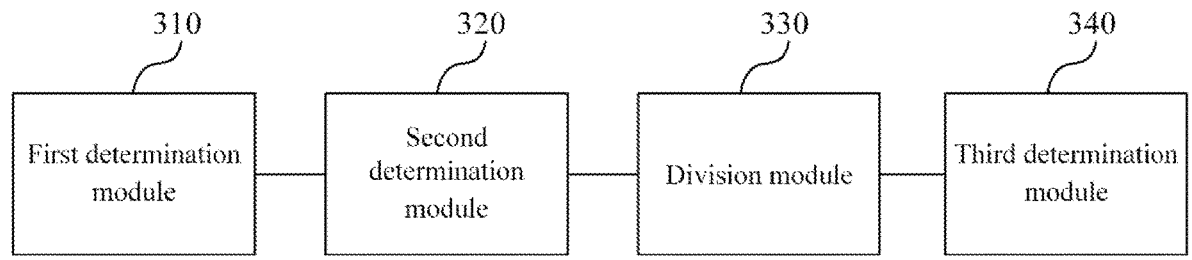
FIG. 5 is a structural diagram of a processing apparatus according to embodiment three of the present disclosure.

FIG. 5 is a structural diagram of a processing apparatus according to embodiment three of the present disclosure. The apparatus is applicable to the case of processing a video. The apparatus may be implemented by software and/or hardware and is generally integrated on a terminal device.

As shown in FIG. 5, the apparatus includes a first determination module 310, a second determination module 320, a division module 330 and a third determination module 340.

The first determination module 310 is configured to determine basic information of a target video.

The second determination module 320 is configured to determine attribute information of the target video based on the basic information.

The division module 330 is configured to in a case where the attribute information indicates that the target video is a video capable of being structured, perform chapter division on the target video based on the basic information to obtain at least two video clips.

The third determination module 340 is configured to determine chapter description information of the at least two video clips, a key frame of the at least two video clips and video description information of the target video.

In the embodiment, the apparatus determines basic information of a target video through the first determination module 310; determines attribute information of the target video based on the basic information through the second determination module 320; performs, in a case where the attribute information indicates that the target video is a video capable of being structured, chapter division on the target video based on the basic information to obtain at least two video clips through the division module 330; and determines chapter description information of the at least two video clips, a key frame of the at least two video clips and video description information of the target video through the third determination module 340. Through the apparatus, the attribute information of the target video is determined, and the accurate division of the target video can be achieved based on the basic information, so that the chapter description information of the video clips, the key frame of the video clips and the video description information of the target video are determined.

Further, the basic information includes one or more pieces of: salient object information, image information, first text information corresponding to text in the target video and second text information corresponding to audio in the target video.

Further, the division module 330 involves the step described below.

Target slice information of the target video is determined based on the image information, the first text information and the second text information, and the target video is divided into the at least two video clips based on a timestamp characterized by the target slice information.

Further, the third determination module 340 involves the step described below.

The chapter description information is determined based on third text information corresponding to text in the video clips, fourth text information corresponding to audio in the video clips, image information corresponding to the video clips and a first copy keyword corresponding to the video clips, where the first copy keyword is determined based on the video clips.

Further, the third determination module 340 involves the step described below.

The video description information is determined based on the first text information, the second text information, the image information and a second copy keyword corresponding to the target video, where the second copy keyword is determined based on the target video.

Further, the third determination module 340 involves the step described below.

The key frame corresponding to the video clips is determined based on the video clips and the chapter description information corresponding to the video clips.

Further, the number of the key frame is at least one, and the key frame is an image corresponding to the chapter description information.

The preceding processing apparatus may execute the processing method provided by any embodiment of the present disclosure, and has functional modules and beneficial effects corresponding to the executed method.

Embodiment Four

Figure 6:
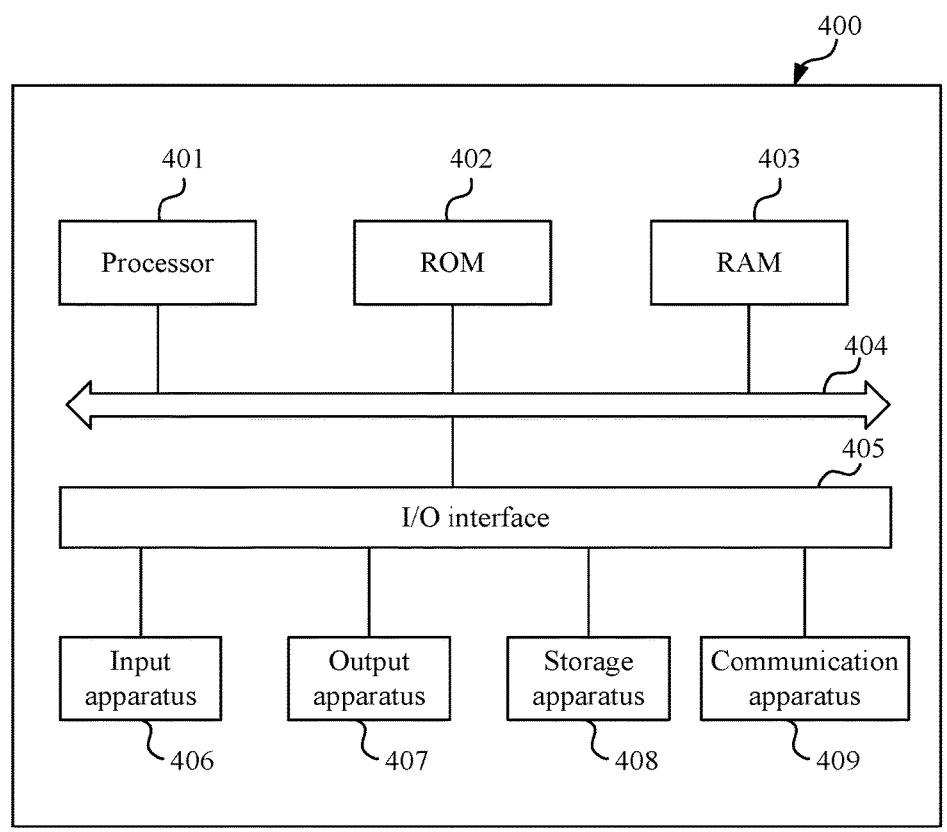
FIG. 6 is a structural diagram of a terminal device according to embodiment four of the present disclosure.

FIG. 6 is a structural diagram of a terminal device according to embodiment four of the present disclosure. FIG. 6 illustrates the structure of the terminal device 400 applicable to implementing the embodiments of the present disclosure. The terminal device 400 in the embodiment of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The terminal device 400 shown in FIG. 6 is merely an example and is not intended to limit the function and usage scope of the embodiment of the present disclosure.

As shown in FIG. 6, the terminal device 400 may include one or more processors (such as a central processing unit, a graphics processing unit) 401. The processors 401 may execute various appropriate actions and processing according to a program stored in a read-only memory (ROM) 402 or a program loaded into a random-access memory (RAM) 403 from a storage apparatus 408. The one or more processors 401 implement the processing method provided by the present disclosure. Various programs and data required for the operation of the terminal device 400 are also stored in the RAM 403. The processors 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer and a gyroscope; an output apparatus 407 such as a liquid crystal display (LCD), a speaker and a vibrator; the storage apparatus 408, configured to store one or more programs, such as a magnetic tape and a hard disk; and a communication apparatus 409. The communication apparatus 409 may allow the terminal device 400 to perform wireless or wired communication with other devices to exchange data. Although FIG. 6 shows the terminal device 400 having various apparatuses, it is to be understood that not all of the apparatuses shown here need to be implemented or present. Alternatively, more or fewer apparatuses may be implemented or present.

Particularly, according to the embodiments of the present disclosure, the process described above with reference to the flowcharts may be implemented as a computer software program. For example, the embodiment of the present disclosure includes a computer program product. The computer program product includes a computer program carried in a computer-readable medium. The computer program includes program codes for executing the method shown in the flowcharts. In such an embodiment, the computer program may be downloaded from a network and installed through the communication apparatus 409, or may be installed from the storage apparatus 408, or may be installed from the ROM 402. When the computer program is executed by the processors 401, the preceding functions defined in the method of the embodiments of the present disclosure are executed.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection having one or more wires, a portable computer magnetic disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as the Hypertext Transfer Protocol (HTTP), and may be interconnected with digital data communication (for example, a communication network) in any form or medium. Examples of the communication network include a local area network (LAN), a wide area network (WAN), an internet (such as the Internet) and a peer-to-peer network (such as an Ad-Hoc network), as well as any network currently known or to be developed in the future.

The preceding computer-readable medium may be included in the preceding terminal device 400 or may exist alone without being assembled into the terminal device 400.

The preceding computer-readable medium stores one or more computer programs which, when executed by a processor, execute the method described below.

Basic information of a target video is determined.

Attribute information of the target video is determined based on the basic information.

In a case where the attribute information indicates that the target video is a video capable of being structured, chapter division is performed on the target video based on the basic information to obtain at least two video clips.

Chapter description information of the at least two video clips, a key frame of the at least two video clips and video description information of the target video are determined.

The preceding computer-readable medium carries one or more programs. When the preceding one or more programs are executed by the terminal device, for the terminal device 400, computer program codes for executing the operations of the present disclosure may be written in one or more programming languages or a combination thereof, the programming languages including object-oriented programming languages such as Java, Smalltalk and C++and further including conventional procedural programming languages such as C programming language or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or may be connected to an external computer (for example, via the Internet provided by an Internet service provider).

The flowcharts and block diagrams in the drawings show the possible architecture, function and operation of the system, method and computer program product according to various embodiments of the present disclosure. Each block in the flowcharts or block diagrams may represent a module, a program segment or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The described modules involved in the embodiments of the present disclosure may be implemented in software or in hardware. The name of a module is not intended to limit the module in a certain circumstance.

The functions described above herein may be executed, at least partially, by one or more hardware logic components. For example, without limitations, exemplary types of hardware logic components that may be used include a field programmable gate array (FPGA), an application-specific integrated circuit (ASIC), an application specific standard product (ASSP), a system on a chip (SoC), and a complex programmable logic device (CPLD).

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, example 1 provides a processing method including steps described below.

Basic information of a target video is determined.

Attribute information of the target video is determined based on the basic information.

In a case where the attribute information indicates that the target video is a video capable of being structured, chapter division is performed on the target video based on the basic information to obtain at least two video clips.

Chapter description information of the at least two video clips, a key frame of the at least two video clips and video description information of the target video are determined.

According to one or more embodiments of the present disclosure, in example 2, according to the method of example 1, the basic information includes one or more pieces of: salient object information, image information, first text information corresponding to text in the target video and second text information corresponding to audio in the target video.

According to one or more embodiments of the present disclosure, in example 3, according to the method of example 2, the step in which the chapter division is performed on the target video based on the basic information to obtain the at least two video clips include the step described below.

Target slice information of the target video is determined based on the image information, the first text information and the second text information, and the target video is divided into the at least two video clips based on a timestamp characterized by the target slice information.

According to one or more embodiments of the present disclosure, in example 4, according to the method of example 2, the step in which the chapter description information of the video clips is determined includes the step described below.

The chapter description information is determined based on third text information corresponding to text in the video clips, fourth text information corresponding to audio in the video clips, image information corresponding to the video clips and a first copy keyword corresponding to the video clips, where the first copy keyword is determined based on the video clips.

According to one or more embodiments of the present disclosure, in example 5, according to the method of example 2, the step in which the video description information of the target video is determined includes the step described below.

The video description information is determined based on the first text information, the second text information, the image information and a second copy keyword corresponding to the target video, where the second copy keyword is determined based on the target video.

According to one or more embodiments of the present disclosure, in example 6, according to the method of example 2, the step in which the key frame of the video clips is determined includes the step described below.

The key frame corresponding to the video clips is determined based on the video clips and the chapter description information corresponding to the video clips.

According to one or more embodiments of the present disclosure, in example 7, according to the method of any one of example 1 to example 6, the number of the key frame is at least one, and the key frame is an image corresponding to the chapter description information.

According to one or more embodiments of the present disclosure, example 8 provides a processing apparatus. The processing apparatus includes an acquisition module, a first determination module, a second determination module, a division module and a third determination module.

The acquisition module is configured to acquire a target video and video description information corresponding to the target video.

The first determination module is configured to determine basic information of a target video.

The second determination module is configured to determine attribute information of the target video based on the basic information.

The division module is configured to in a case where the attribute information indicates that the target video is a video capable of being structured, perform chapter division on the target video based on the basic information to obtain at least two video clips.

The third determination module is configured to determine chapter description information of the at least two video clips, a key frame of the at least two video clips and video description information of the target video.

According to one or more embodiments of the present disclosure, example 9 provides a terminal device. The terminal device includes one or more processors and a storage apparatus configured to store one or more programs.

The one or more programs, when executed by the one or more processors, cause the one or more processors to implement the method according to any one of example 1 to example 7.

According to one or more embodiments of the present disclosure, example 10 provides a computer-readable medium storing a computer program. The program, when executed by a processor, implements the method according to any one of example 1 to example 7.

The preceding description is merely illustrative of preferred embodiments of the present disclosure and the technical principles used therein. Those skilled in the art should understand that the scope referred to in the present disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding features and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable subcombination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A processing method, comprising:
    determining basic information of a target video, wherein the basic information comprises at least one of: salient object information, image information, first text information corresponding to text in the target video or second text information corresponding to audio in the target video;
    determining attribute information of the target video based on the basic information;
    in a case where the attribute information indicates that the target video is a video capable of being structured, performing chapter division on the target video based on the basic information to obtain at least two video clips; and
    determining chapter description information of the at least two video clips, a key frame of the at least two video clips and video description information of the target video;
    wherein determining the chapter description information of the at least two video clips comprises:
    determining the chapter description information based on third text information corresponding to text in the at least two video clips, fourth text information corresponding to audio in the at least two video clips, image information corresponding to the at least two video clips and a first copy keyword corresponding to the at least two video clips, wherein the first copy keyword is determined based on the at least two video clips.

2. The method according to claim 1, wherein performing the chapter division on the target video based on the basic information to obtain the at least two video clips comprises:
    determining target slice information of the target video based on the image information, the first text information and the second text information; and
    dividing the target video into the at least two video clips based on a timestamp characterized by the target slice information.

3. The method according to claim 1, wherein determining the video description information of the target video comprises:
    determining the video description information based on the first text information, the second text information, the image information and a second copy keyword corresponding to the target video, wherein the second copy keyword is determined based on the target video.

4. The method according to claim 1, wherein determining the key frame of the at least two video clips comprises:
    determining the key frame corresponding to the at least two video clips based on the at least two video clips and the chapter description information corresponding to the at least two video clips.

5. The method according to claim 1, wherein at least one key frame is provided, and each of the least one key frame is an image corresponding to the chapter description information.

6. A terminal device, comprising:
    one or more processors; and
    a storage apparatus configured to store one or more programs;
    wherein the one or more programs, when executed by the one or more processors, cause the one or more processors to implement:
    determining basic information of a target video, wherein the basic information comprises at least one of: salient object information, image information, first text information corresponding to text in the target video or second text information corresponding to audio in the target video;
    determining attribute information of the target video based on the basic information;
    in a case where the attribute information indicates that the target video is a video capable of being structured, performing chapter division on the target video based on the basic information to obtain at least two video clips; and
    determining chapter description information of the at least two video clips, a key frame of the at least two video clips and video description information of the target video;
    wherein the processors determine the chapter description information of the at least two video clips by:
    determining the chapter description information based on third text information corresponding to text in the at least two video clips, fourth text information corresponding to audio in the at least two video clips, image information corresponding to the at least two video clips and a first copy keyword corresponding to the at least two video clips, wherein the first copy keyword is determined based on the at least two video clips.

7. The device according to claim 6, wherein the processors perform the chapter division on the target video based on the basic information to obtain the at least two video clips by:
    determining target slice information of the target video based on the image information, the first text information and the second text information; and
    dividing the target video into the at least two video clips based on a timestamp characterized by the target slice information.

8. The device according to claim 6, wherein the processors determine the video description information of the target video by:
    determining the video description information based on the first text information, the second text information, the image information and a second copy keyword corresponding to the target video, wherein the second copy keyword is determined based on the target video.

9. The device according to claim 6, wherein the processors determine the key frame of the at least two video clips by:
   determining the key frame corresponding to the at least two video clips based on the at least two video clips and the chapter description information corresponding to the at least two video clips.

10. The device according to claim 6, wherein at least one key frame is provided, and each of the least one key frame is an image corresponding to the chapter description information.

11. A non-transitory computer-readable storage medium storing a computer program which, when executed by a processor, implements:
   determining basic information of a target video, wherein the basic information comprises at least one of: salient object information, image information, first text information corresponding to text in the target video or second text information corresponding to audio in the target video;
   determining attribute information of the target video based on the basic information;
   in a case where the attribute information indicates that the target video is a video capable of being structured, performing chapter division on the target video based on the basic information to obtain at least two video clips; and
   determining chapter description information of the at least two video clips, a key frame of the at least two video clips and video description information of the target video;
   wherein the computer program determines the chapter description information of the at least two video clips by: determining the chapter description information based on third text information corresponding to text in the at least two video clips, fourth text information corresponding to audio in the at least two video clips, image information corresponding to the at least two video clips and a first copy keyword corresponding to the at least two video clips, wherein the first copy keyword is determined based on the at least two video clips.

12. The non-transitory computer-readable storage medium according to claim 11, wherein the computer program performs the chapter division on the target video based on the basic information to obtain the at least two video clips by:
   determining target slice information of the target video based on the image information, the first text information and the second text information; and
   dividing the target video into the at least two video clips based on a timestamp characterized by the target slice information.

13. The non-transitory computer-readable storage medium according to claim 11, wherein the computer program determines the video description information of the target video by:
   determining the video description information based on the first text information, the second text information, the image information and a second copy keyword corresponding to the target video, wherein the second copy keyword is determined based on the target video.

14. The non-transitory computer-readable storage medium according to claim 11, wherein the computer program determines the key frame of the at least two video clips by:
   determining the key frame corresponding to the at least two video clips based on the at least two video clips and the chapter description information corresponding to the at least two video clips.

* * * * *